W. A. H. PEAREN.
SHACKLE.
APPLICATION FILED JULY 5, 1917.
1,262,974.
Patented Apr. 16, 1918.
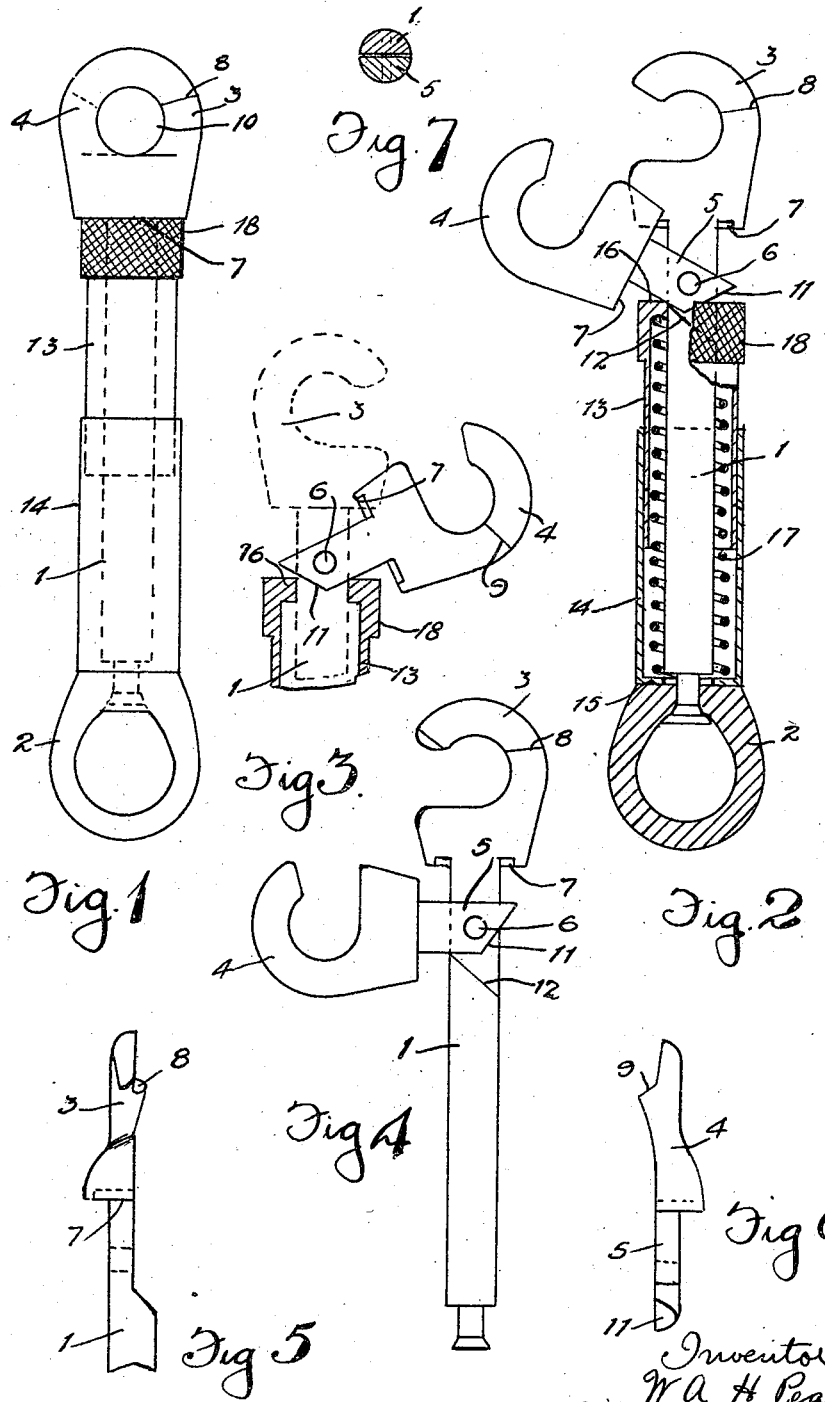

UNITED STATES PATENT OFFICE.

WESLEY ALBERT HAROLD PEAREN, OF MEDORA, MANITOBA, CANADA.

SHACKLE.

1,262,974. Specification of Letters Patent. Patented Apr. 16, 1918.

Application filed July 5, 1917. Serial No. 178,858.

*To all whom it may concern:*

Be it known that I, WESLEY ALBERT HAROLD PEAREN, of the town of Medora, in the Province of Manitoba, Canada, have invented certain new and useful Improvements in Shackles, of which the following is the specification.

The invention relates to improvements in shackles and the principal object of the invention is to provide a shackle which, when closed, will positively remain closed and one which can be readily manipulated to open or close as occasion may require.

A further object of the invention is to construct the device in an inexpensive and durable manner and so that it can be readily manufactured and assembled.

With the above objects in view the invention consists essentially in a long shank having a hooked end, a short shank pivoted to the long shank and fitted also with a hooked end, a pair of telescoping tubes on the shank, a tie ring and a spring, the parts being arranged and constructed as hereinafter more particularly described and later pointed out in the appended claims, reference being had to the accompanying drawing in which: —

Figure 1 represents a side view of the complete shackle in the closed position.

Fig. 2 represents a longitudinal sectional view through the sleeves with the parts in the open position.

Fig. 3 represents a sectional view through the upper end of the shackle showing the opposite side to that shown in Fig. 2 with the stationary hook and carrying shank in dotted outline.

Fig. 4 represents a side view of the shanks and hooks removed from the sleeves.

Fig. 5 represents a front view of the stationary hook.

Fig. 6 represents a back view of the swinging hook.

Fig. 7 represents a cross sectional view through the two shanks in the closed position of the swinging shank.

In the drawing like characters of reference indicate corresponding parts in the several figures.

1 represents a comparatively long circular shank, the lower end of which carries a swivel tie ring 2. The upper end of the shank is formed into a hook 3 which I herein term a stationary hook to distinguish it from the swinging hook 4 carried by a short shank 5 pivotally secured at 6 to the shank 1.

Here I wish it to be noticed that the upper end of the shank 1 adjacent the hook 3 is half cut away and that the shank 5 is semi-circular in cross section so that the cross sectional area of the two shanks is equal to the full cross sectional area of the shank 1.

The hooks are fashioned so that when closed the overhanging end of the one hook engages a stop shoulder on the other and such that they present a right angled shoulder indicated at 7 on the underside. The stop shoulders are indicated at 8 and 9.

Obviously from the structure shown the closed hooks inclose a circular opening 10 in which actually a ring or such like is caught. The lower end of the short shank is cut at an incline to provide a releasing face 11 and said releasing face is adapted in the closed position of the swinging hook to engage an inclined mating shoulder 12 formed on the stationary shank.

On the shank between the hooks and the ring I mount inner and outer telescopic sleeves 13 and 14 both of which have their outer ends in-flanged as indicated at 15 and 16 and contain a coiled spring 17 which surrounds the shank and bears against the flanges of the sleeves.

When the hooks are in the closed position the upper end of the sleeve 13 is adapted to engage the shoulder 7 of the hooks which it will be noticed is well above the pivot point 6, being pressed against the shoulder by the action of the spring. Accordingly the hooks are locked in the closed position and cannot possibly open until the sleeve is slipped down to release the swinging shank.

For convenience in manipulating the upper end of the sleeve is enlarged into a roughened finger grip 18.

I wish it here to be noticed that the undersides of the hooks are milled out to receive the upper end of the finger grip. This arrangement protects the finger grip from being accidentally shoved back as would occur in a construction where it would be exposed and could be caught on a manger or other structure.

In order to better understand my invention I will now described the manner in which it is opened, reference being had initially to Fig. 1.

With the shackle in the upright position as shown and one drawing down the top sleeve by finger pressure on the finger piece it will be seen that the swinging shank will be released and that upon its release the swinging hook will swing down by gravity to the position as shown in Fig. 2. In this position it is locked open as the releasing face 11 will be caught at one side of the pivot point 6 by the flange 16 and the underside of the shank at the other side of the pivot point will be caught by the said flange 16. Here it is to be remembered that the spring is pressing the sleeve continuously upwardly. After one has caught the hook 3 in the ring or such like to which the shackle is to be attached he simply presses the swinging hook over to closed position and the shackle locks itself as the incline face 11 will ride on the flange 16 and gradually press the sleeve down against the action of the spring until the swinging shank is in a vertical position when the face 11 will clear the flange and the outer sleeve will fly up and seat against the shoulder.

What I claim as my invention is:—

1. A shackle comprising a comparatively long shank fitted at the upper end with a hook and at the lower end with a tie ring, a comparatively short shank pivotally secured to the upper end of the former shank and provided with a mating hook, said hooks, when closed, being formed to present an under shoulder, a pair of telescopic tubes mounted on the shanks between the ring and the shoulder and a spreading spring contained within the tubes.

2. A shackle comprising a comparatively long shank having the upper end thereof reduced in cross section and provided with a hook and presenting at the point of reduced section an inclined shoulder, a relatively short swinging shank pivotally secured to the upper end of the former shank and provided with a mating hook and having the lower end thereof fitted with an inclined face complementary to the inclined shoulder, a tie ring secured to the lower end of the long shank, a pair of telescoping sleeves mounted on the shank and bearing normally against the tie ring and the underside of the hooks which are fashioned to represent a shoulder and a coiled spring contained within the sleeves and normally spreading them apart.

Signed at Medora, this 12th day of June, 1917.

WESLEY ALBERT HAROLD PEAREN.

In the presence of—
M. S. COLQUHOUN,
MURIEL A. HEATH.

Copies of this patent may be obtained for five cents each, by addressing the "Commissioner of Patents, Washington, D. C."